United States Patent
Nakayama

(10) Patent No.: US 12,325,163 B2
(45) Date of Patent: Jun. 10, 2025

(54) SHUT-OFF NOZZLE, INJECTION DEVICE, AND INJECTION MOLDING MACHINE

(71) Applicant: THE JAPAN STEEL WORKS, LTD., Tokyo (JP)

(72) Inventor: Kiyotaka Nakayama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 90 days.

(21) Appl. No.: 18/354,070

(22) Filed: Jul. 18, 2023

(65) Prior Publication Data
US 2025/0026056 A1 Jan. 23, 2025

(30) Foreign Application Priority Data
Jul. 19, 2022 (JP) .................................. 2022-114491

(51) Int. Cl.
B29C 45/23 (2006.01)
(52) U.S. Cl.
CPC .................................. B29C 45/231 (2013.01)

(58) Field of Classification Search
CPC .. B29C 45/231; B29C 45/24; B29C 2045/237
See application file for complete search history.

(56) References Cited

FOREIGN PATENT DOCUMENTS

| JP | 3-274125 A | 12/1991 | |
| JP | 2755136 B2 * | 5/1998 | ........... B29C 45/231 |

* cited by examiner

Primary Examiner — Virak Nguon
(74) Attorney, Agent, or Firm — Sughrue Mion, PLLC

(57) ABSTRACT

A shut-off nozzle includes a nozzle body portion, a needle valve, and a needle driving mechanism including a cylinder mechanism and a spring holder. The nozzle body portion includes a valve housing and the valve housing has a needle hole, into which a rear end portion of the needle valve is insertable, and a spring holder hole. The spring holder is inserted in the spring holder hole in a direction orthogonal to the axial direction in a state in which slide in the axial direction is allowed, and both ends of the spring holder are fixed to the cylinder mechanism. A central portion of the spring holder presses the rear end portion of the needle valve. Enlargement portions are formed in both side surfaces of the valve housing continuous with the spring holder hole.

15 Claims, 7 Drawing Sheets

SHUT-OFF NOZZLE, INJECTION DEVICE, AND INJECTION MOLDING MACHINE

CROSS-REFERENCE TO RELATED APPLICATIONS

This application is based on and claims priority under 35 USC 119 from Japanese Patent Application No. 2022-114491 filed on Jul. 19, 2022, the entire content of which is incorporated herein by reference.

TECHNICAL FIELD

The present disclosure relates to a shut-off nozzle in which a needle valve is coaxially provided in a nozzle body portion to open and close a resin flow path, an injection device including such a shut-off nozzle, and an injection molding machine.

BACKGROUND

A shut-off nozzle provided in an injection device of an injection molding machine can prevent so-called drooling by opening and closing an injection flow path of an injection nozzle through which a resin flows. There are various types of shut-off nozzles, for example, a type is described in JPH3-274125A. This type of shut-off nozzle includes a nozzle body and a needle valve provided obliquely with respect to the nozzle body. The nozzle body has an oblique hole extending from an outer peripheral surface thereof to an injection flow path in the nozzle body, that is, a needle hole. The needle valve is inserted into the needle hole so as to be freely movable back and forth. When the needle valve is moved forward, the injection flow path is closed, and when the needle valve is moved backward, the injection flow path is opened.

SUMMARY

A shut-off nozzle in which a needle valve is provided coaxially with a nozzle body is also known. In such a shut-off nozzle, the needle valve is inserted into an injection flow path formed in the nozzle body so as to be freely movable back and forth. When the needle valve moves forward, the injection flow path at a tip of the nozzle body is closed. In such a shut-off nozzle, the needle valve is inserted into a needle hole formed in the nozzle body and a rear end portion thereof is exposed, and the needle valve is driven by a predetermined needle driving mechanism via the rear end portion. The resin leaks out little by little from a gap between the needle hole and the needle valve. The leaked resin needs to be removed by cleaning, but the cleaning may be difficult.

The present disclosure provides a shut-off nozzle that facilitates cleaning of leaked resin.

Other problems and novel features will become apparent from description of the present description and the accompanying drawings.

The present disclosure is directed to a shut-off nozzle including a nozzle body portion; a needle valve insertable coaxially with the nozzle body portion and configured to open and close an outlet of a resin flow path; and a needle driving mechanism configured to drive the needle valve. The needle driving mechanism includes a cylinder mechanism and a spring holder. The nozzle body portion includes a valve housing. The valve housing has a needle hole in an axial direction and a spring holder hole orthogonal to the axial direction. A rear end portion of the needle valve is insertable into the needle hole. The spring holder is inserted in the spring holder hole in a direction orthogonal to the axial direction in a state in which slide in the axial direction is allowed, and both ends of the spring holder are fixed to the cylinder mechanism. A central portion of the spring holder is in contact with or connected with the rear end portion of the needle valve. The needle valve is driven by the cylinder mechanism via the spring holder. Enlargement portions are formed in both side surfaces of the valve housing. Each of the enlargement portions is continuous with the spring holder hole and has a shape enlarged from the spring holder hole.

According to the present disclosure, the leaked resin is easily removed and cleaned at the enlargement portions.

DETAILED DESCRIPTION

Figure 1:
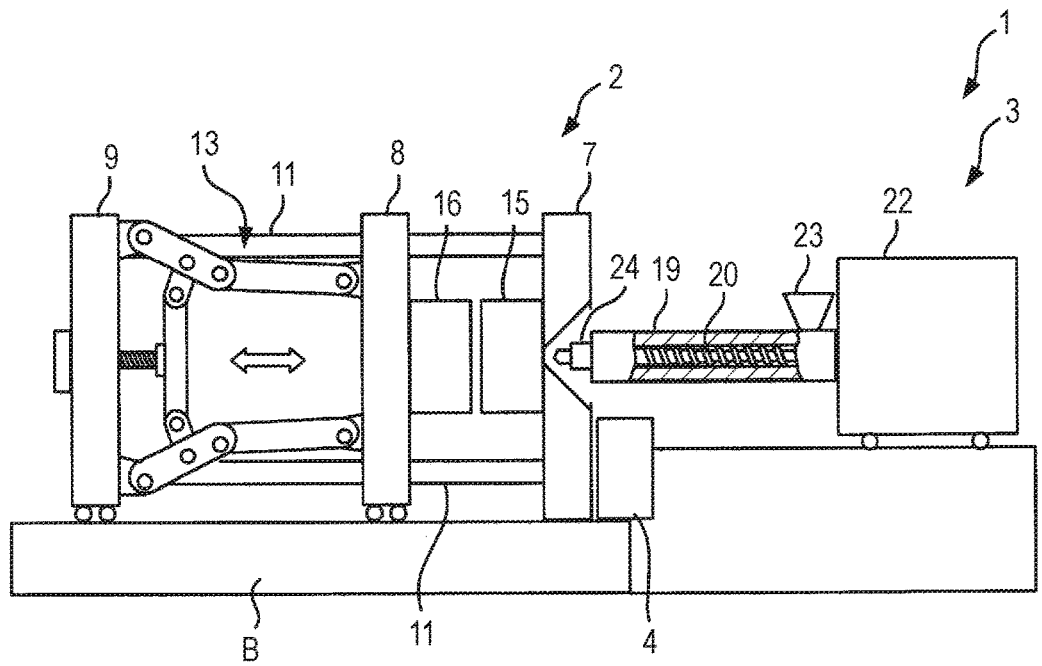
FIG. 1 is a front view showing an injection molding machine according to the present illustrative embodiment.

Hereinafter, a specific illustrative embodiment will be described in detail with reference to the drawings. However, the present invention is not limited to the following illustrative embodiments. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

{Injection Molding Machine}

As shown in FIG. 1, an injection molding machine 1 according to the present illustrative embodiment includes a mold clamping device 2, an injection device 3, and the like. The injection molding machine 1 includes a controller, that is, a control device 4. The mold clamping device 2, the injection device 3, and the like are controlled by the control device 4.

{Mold Clamping Device}

The mold clamping device 2 includes a fixed plate 7 fixed to a bed B, a movable plate 8 slidably provided on the bed B, and a mold clamping housing 9. The fixed plate 7 and the mold clamping housing 9 are connected by a plurality of tie bars 11, 11, . . . . The movable plate 8 is slidable between the fixed plate 7 and the mold clamping housing 9. A mold clamping mechanism, that is, a toggle mechanism 13 in the present illustrative embodiment is provided between the mold clamping housing 9 and the movable plate 8. The fixed plate 7 and the movable plate 8 are provided with a fixed mold 15 and a movable mold 16, respectively. Accordingly, the molds 15, 16 are opened and closed when the toggle mechanism 13 is driven.

{Injection Device}

The injection device 3 includes a heating cylinder 19, a screw 20 provided in the heating cylinder 19, and a screw driving device 22. The heating cylinder 19 is supported by the screw driving device 22, and the screw 20 is driven in a rotation direction and an axial direction by the screw driving device 22. The heating cylinder 19 is provided with a hopper 23 and a shut-off nozzle 24 according to the present illustrative embodiment to be described in detail below.

{Shut-Off Nozzle According to Present Illustrative Embodiment}

Figure 2A:
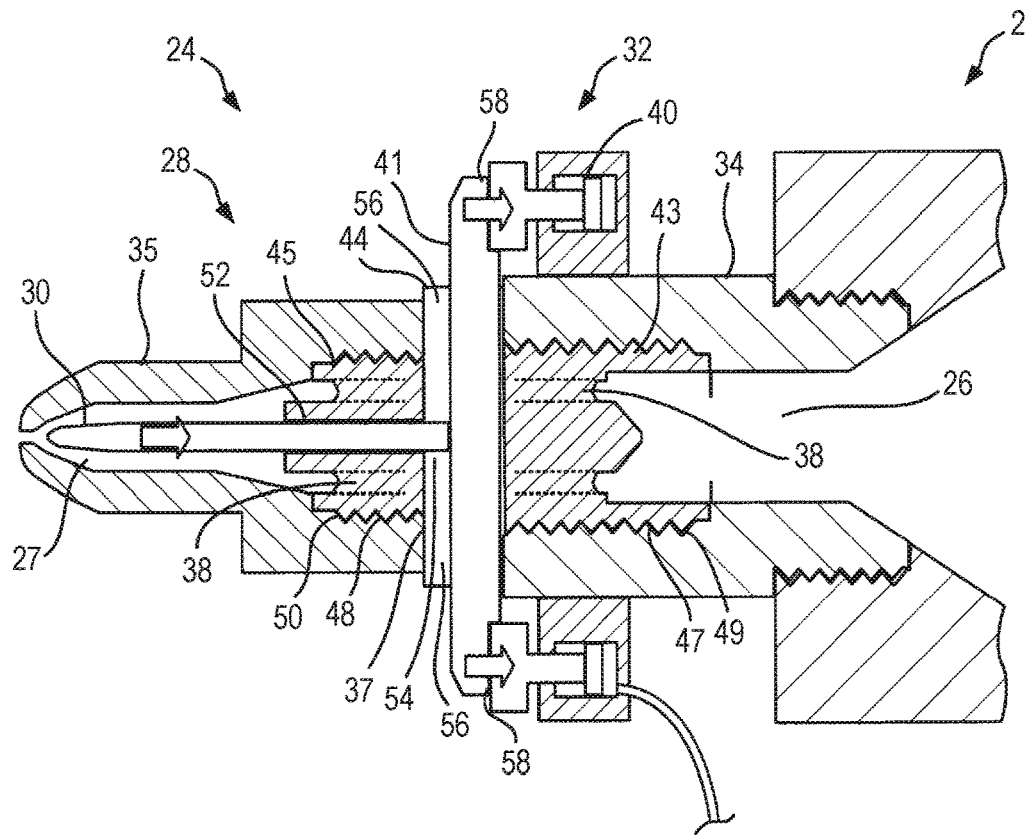
FIG. 2A is a front cross-sectional view showing a shut-off nozzle according to the present illustrative embodiment.

As shown in FIG. 2A, the shut-off nozzle 24 according to the present illustrative embodiment includes a nozzle body portion 28, a needle valve 30, and a needle driving mechanism 32. Resin flow paths 26, 27 are formed in the nozzle body portion 28. The needle valve 30 is inserted in the nozzle body portion 28. The needle driving mechanism 32 is configured to drive the needle valve 30. When viewed with reference to a central axis of the horizontally provided heating cylinder 19, the nozzle body portion 28 is provided substantially coaxially with the heating cylinder 19, and the needle valve 30 is provided coaxially with the nozzle body portion 28.

The nozzle body portion 28 includes three members in the present illustrative embodiment. That is, the nozzle body portion 28 includes a nozzle base portion 34 provided at the heating cylinder 19, a nozzle tip portion 35 provided at a tip end, and a valve housing 37 connecting the nozzle base portion 34 and the nozzle tip portion 35. A plurality of communication holes 38, 38, . . . are formed in the valve housing 37 according to the present illustrative embodiment, and establish communication between the resin flow path 26 in the nozzle base portion 34 and the resin flow path 27 in the nozzle tip portion 35.

The needle driving mechanism 32 includes an annular cylinder mechanism 40 and a spring holder 41. The annular cylinder mechanism 40 is provided to surround an outer periphery of the nozzle base portion 34. The spring holder 41 is accommodated in the valve housing 37. The spring holder 41 is connected to the cylinder mechanism 40 and is driven by the cylinder mechanism 40, which will be described in detail later. The needle valve 30 is driven by the spring holder 41.

The cylinder mechanism 40 is driven by, for example, air. When air is supplied to the cylinder mechanism 40, the spring holder 41 is pushed and moved forward. Accordingly, the needle valve 30 moves forward to close the resin flow path 27 in the nozzle tip portion 35. On the other hand, when the air supply to the cylinder mechanism 40 is stopped, the spring holder 41 moves backward. Accordingly, the needle valve 30 moves backward, and the resin flow path 27 is opened. Here, the "moves forward" means moving in a direction (forward) toward the mold clamping device 2, and "moves backward" means moving in a direction (backward) away from the mold clamping device 2. The cylinder mechanism 40 may be driven by other fluids such as hydraulic oil and water. The spring holder 41 may be driven by a driving mechanism other than the cylinder mechanism 40, such as an electric driving mechanism.

{Valve Housing}

Figure 3:
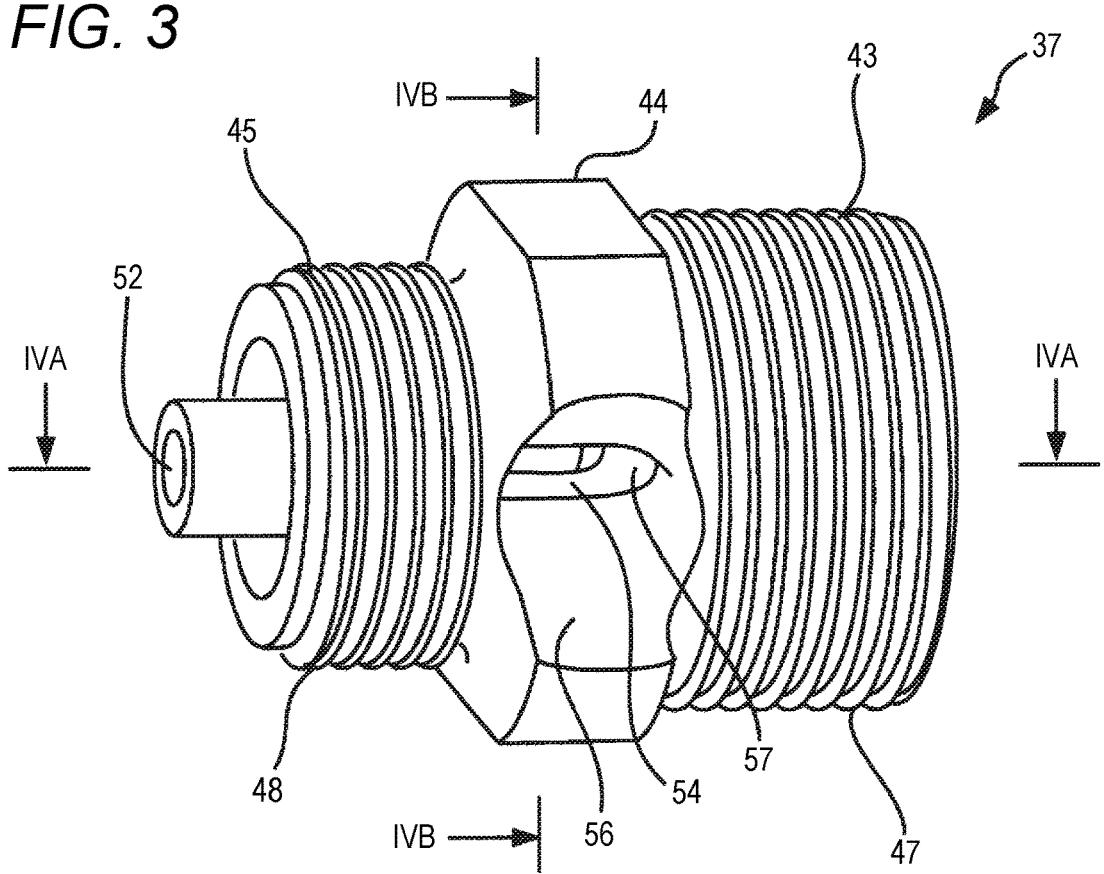
FIG. 3 is a perspective view showing a valve housing of the shut-off nozzle according to the present illustrative embodiment.
Figure 4A:
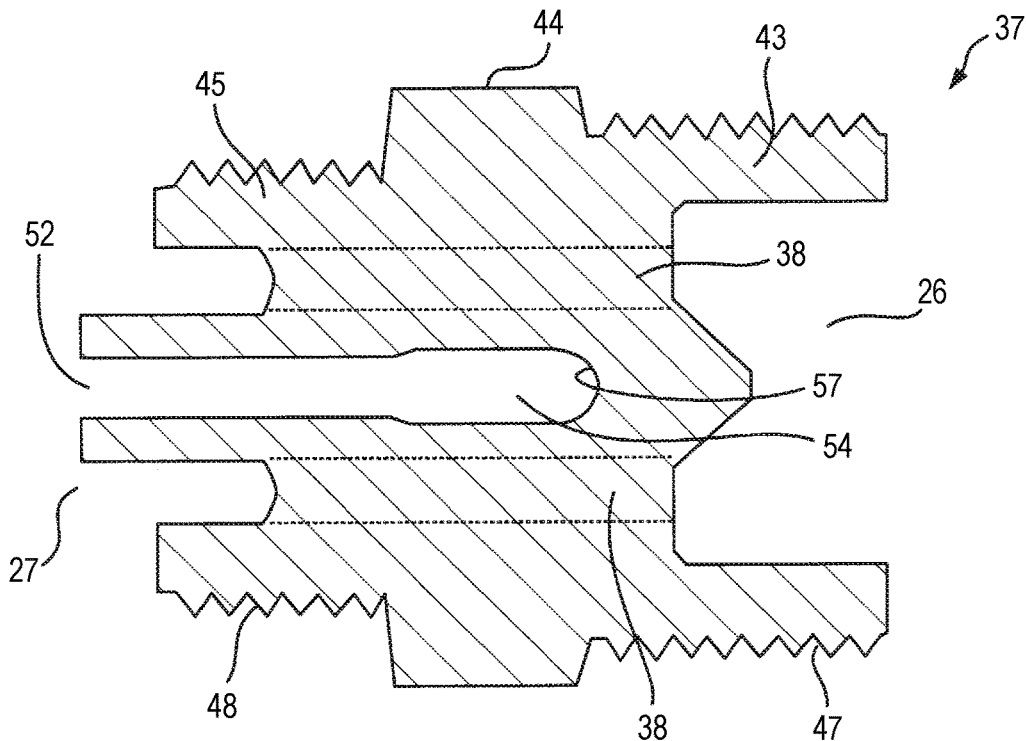
FIG. 4A is a cross-sectional view of the valve housing of the shut-off nozzle according to the present illustrative embodiment taken along a line IVA-IVA in FIG. 3.

The valve housing 37 according to the present illustrative embodiment will be described. As shown in FIGS. 2A and 3, the valve housing 37 includes a base connection portion 43 connected with the nozzle base portion 34, a spring holder housing portion 44 for housing the spring holder 41, and a tip connection portion 45 to which the nozzle tip portion is attached, which are integrally formed. As shown in FIG. 2A, the base connection portion 43 and the tip connection portion 45 are provided with, on respective outer peripheral surfaces thereof, male threads 47, 48, and are respectively attached to female threads 49, 50 formed in the nozzle base portion 34 and the nozzle tip portion 35. FIG. 4A shows a cross-sectional view of the valve housing 37 taken along a line IVA-IVA in FIG. 3. A needle hole 52 is formed in the tip connection portion 45 coaxially with the tip connection portion 45. A rear end portion of the needle valve 30 is inserted into the needle hole 52, as shown in FIG. 2A.

As shown in FIG. 3, a spring holder hole 54 is formed in the spring holder housing portion 44 of the valve housing 37. The spring holder hole 54 is a hole extending perpendicularly to the axial direction and penetrating the spring holder housing portion 44, into which the spring holder 41 (see FIG. 2A) to be described later is inserted. The needle hole 52 and the spring holder hole 54 communicate with each other as shown in FIG. 4A. Accordingly, the rear end portion of the needle valve 30 (see FIG. 2A) inserted into the needle hole 52 is brought into contact with the spring holder 41, and the needle valve 30 is driven when the spring holder 41 slides.

Figure 4B:
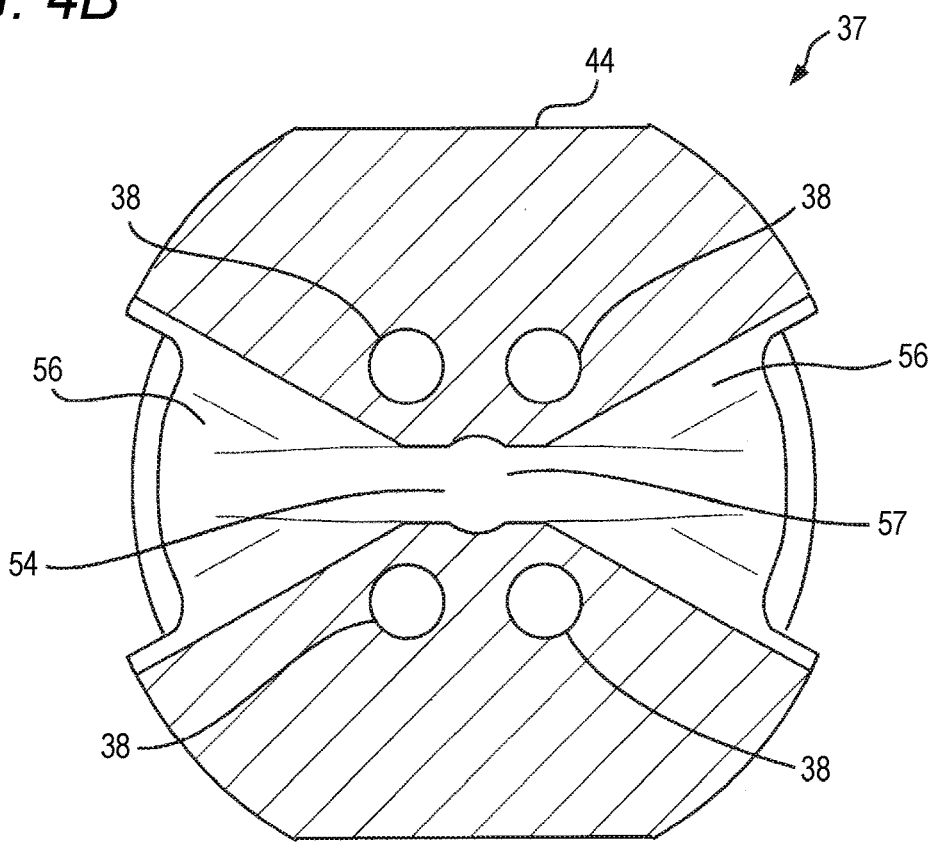
FIG. 4B is a cross-sectional view of the valve housing of the shut-off nozzle according to the present illustrative embodiment taken along a line IVB-IVB in FIG. 3.

The valve housing 37 according to the present illustrative embodiment is characterized by being related to the spring holder hole 54. FIG. 4B is a cross-sectional view of the valve housing 37 taken along a line IVB-IVB in FIG. 3. A first feature of the valve housing 37 is that cleaning-purpose enlargement portions 56, 56 are formed. The cleaning-purpose enlargement portions 56, 56 are both cut out in a fan shape from both side surfaces in the spring holder housing portion 44. The cleaning-purpose enlargement portions 56, 56 are continuous with the spring holder hole 54, and both have a shape suitable for cleaning a resin that leaks and accumulates in the spring holder hole 54. In the present illustrative embodiment, the cleaning-purpose enlargement portions 56, 56 are both formed in a fan shape. However, the shape is not limited to the fan shape as long as the spring holder hole 54 is enlarged at both ends thereof.

A second feature is that, as shown in FIG. 4A, a U-shaped groove 57, which is a groove having a U shape, is formed in a part of a surface of the spring holder hole 54. The U-shaped groove 57 is formed to be in contact with the spring holder 41 (see FIG. 2A), which will be described next, and thus the resin that leaks and accumulates in the spring holder hole 54 can be pushed out to the cleaning-purpose enlargement portions 56, 56, as to be described later. In this illustrative embodiment, as shown in FIG. 4B, the U-shaped groove 57 extends not only to the inside of the spring holder hole 54 but also to the cleaning-purpose enlargement portions 56, 56.

{Spring Holder}

Figure 5:
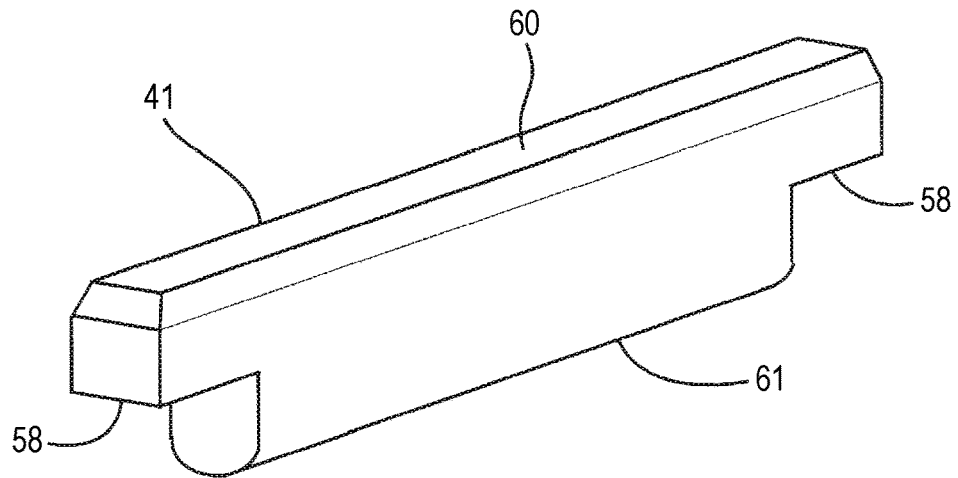
FIG. 5 is a perspective view showing a spring holder of the shut-off nozzle according to the present illustrative embodiment.

As shown in FIG. 5, the spring holder 41 according to the present illustrative embodiment has a flat rod shape. Both ends of the spring holder 41 are partially cut out, and stepped portions 58, 58 are formed. The stepped portions 58, 58 are fixed to the cylinder mechanism 40 (see FIG. 2A). The spring holder 41 is driven by the cylinder mechanism 40. An upper surface 60 of the spring holder 41 in FIG. 5 is formed as a flat surface. At a central portion of the upper surface 60, the rear end portion of the needle valve 30 (see FIG. 2A) is pressed. The spring holder 41 according to the present illustrative embodiment is characterized in that a bottom surface thereof is formed into a convex curved surface 61 that is convexly curved. When the convex curved surface 61 is brought into contact with the U-shaped groove 57 (see FIG. 4B), the leaked resin is pushed out. A curvature of the convex curved surface 61 is slightly larger than that of the U-shaped groove 57.

{Operation of Shut-Off Nozzle}

Figure 6A:
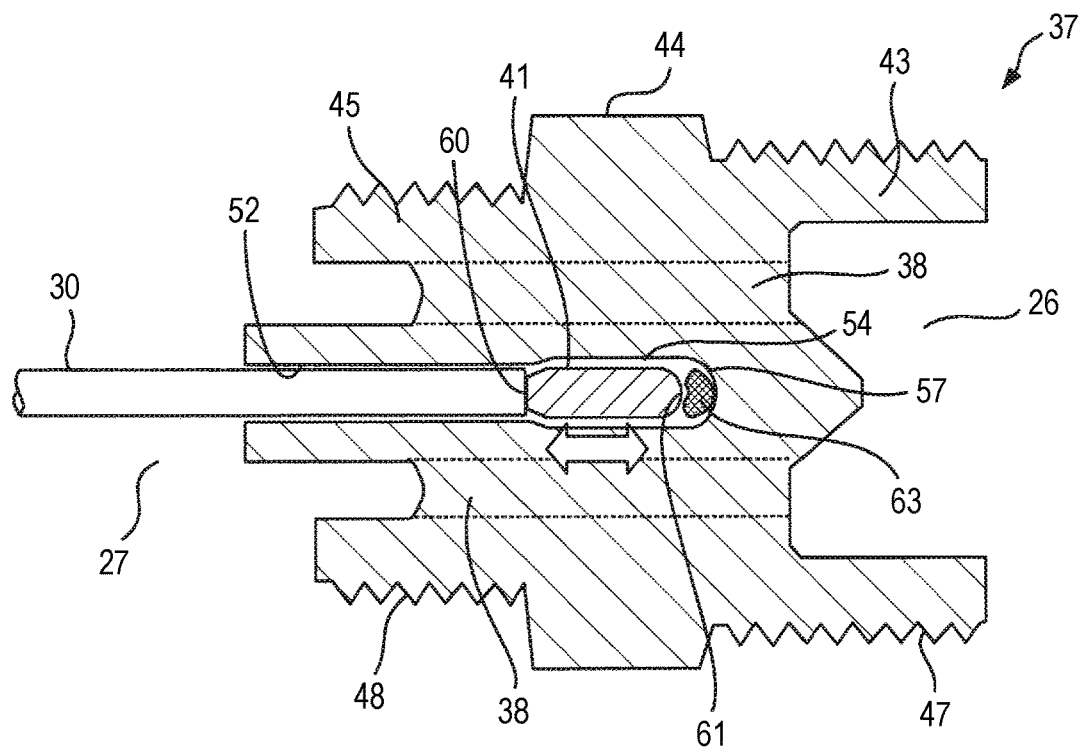
FIG. 6A is a cross-sectional view showing the valve housing, a part of a needle valve, and the spring holder of the shut-off nozzle according to the present illustrative embodiment.

An operation of the shut-off nozzle 24 according to the present illustrative embodiment will be described. As shown in FIG. 6A, the spring holder 41 is inserted in the spring holder hole 54 in a state in which sliding in the axial direction is allowed. The rear end portion of the needle valve 30 is brought into contact with the upper surface 60 of the spring holder 41. As shown in FIG. 2A, the cylinder mechanism 40 is driven to move the spring holder 41 backward. Then, a force with which the spring holder 41 presses the needle valve is substantially zero. When the screw 20 is driven in the axial direction in the injection device 3 (see FIG. 1), a resin pressure in the resin flow path 27 increases. Since a tip end of the needle valve 30 is tapered, the needle valve 30 is moved backward by the resin pressure. Thus, the resin flow path 27 is opened and the resin can be injected.

Figure 2B:
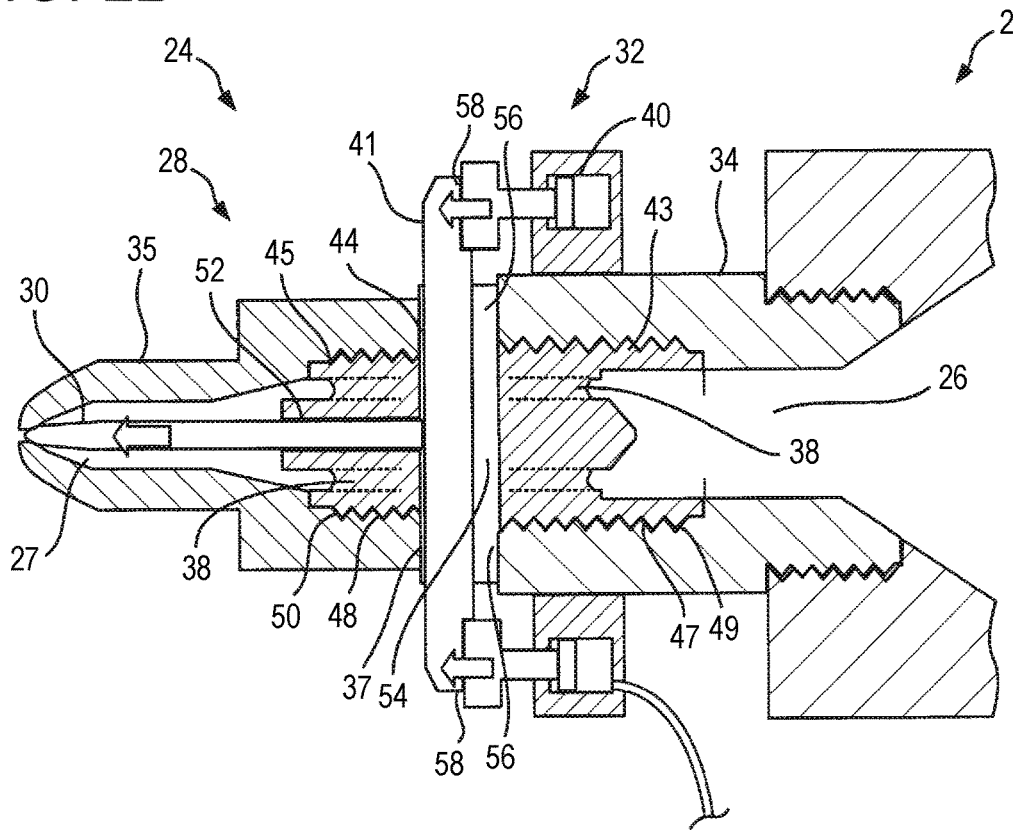
FIG. 2B is a front cross-sectional view showing the shut-off nozzle according to the present illustrative embodiment.

The cylinder mechanism 40 is driven to move the spring holder 41 forward. Then, as shown in FIG. 2B, the spring holder 41 slides in the spring holder hole 54 to push the needle valve 30. The tip end of the needle valve 30 closes an outlet of the resin flow path 27. As a result, drooling of the resin can be prevented.

Figure 6B:
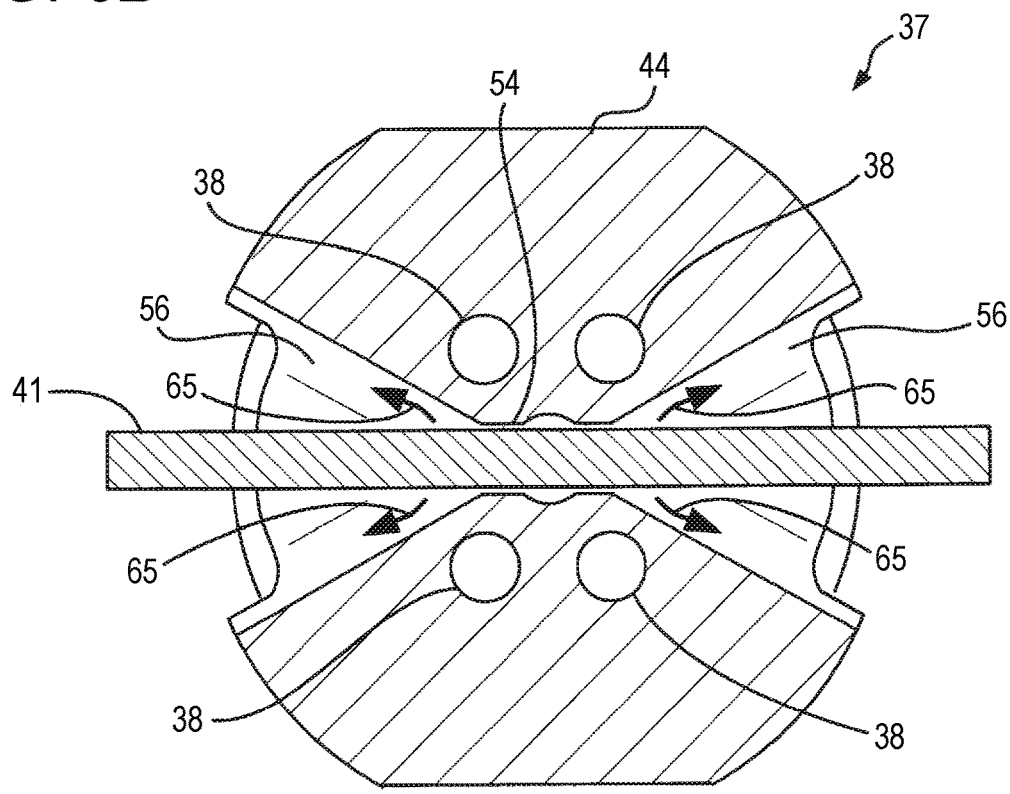
FIG. 6B is a cross-sectional view showing the valve housing and the spring holder of the shut-off nozzle according to the present illustrative embodiment.

When the shut-off nozzle 24 is operated for a long period, the resin leaks out little by little from a gap between the needle hole 52 and the needle valve 30. A leaked resin 63 accumulates in the spring holder hole 54 as shown in FIG. 6A. As shown in FIG. 2A, the cylinder mechanism 40 is driven to move the spring holder 41 backward. Then, the resin 63 (see FIG. 6A) is pressed by the U-shaped groove 57 and the convex curved surface 61. When being pressed, the resin 63 is pushed out to the cleaning-purpose enlargement portions 56, 56 as indicated by arrows 65, 65, . . . in FIG. 6B. That is, the leaked resin does not stay in the spring holder hole 54 but moves to the cleaning-purpose enlargement portions 56, 56. Since being relatively wide, the cleaning-purpose enlargement portions 56, 56 can be easily cleaned during maintenance.

Comparative Example

Figure 7:
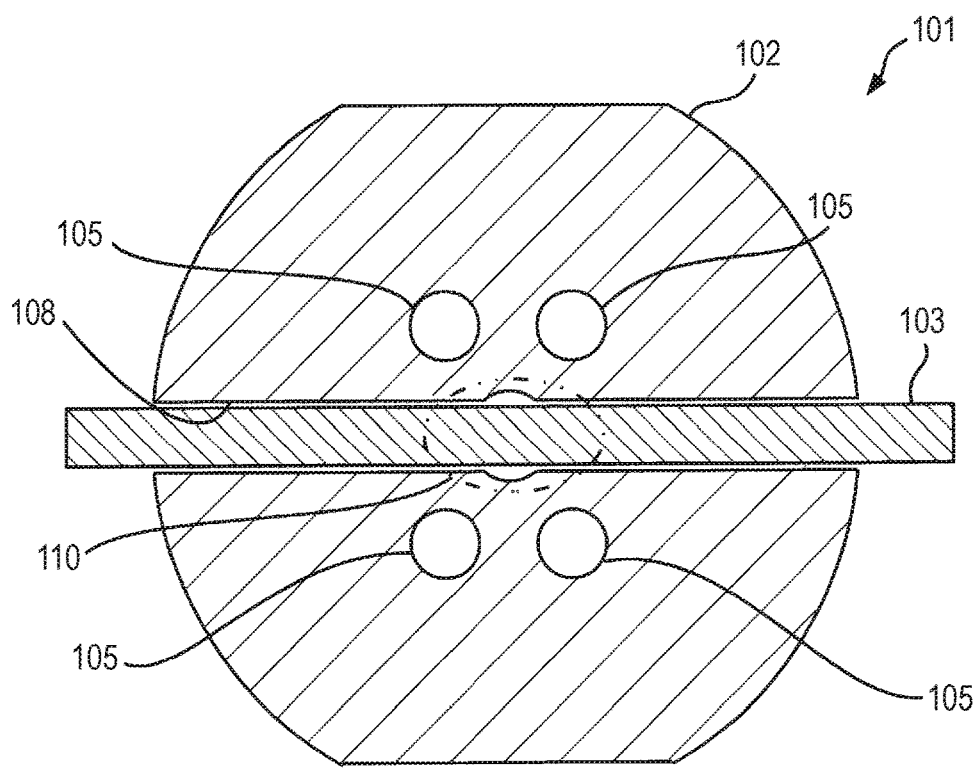
FIG. 7 is a cross-sectional view of a valve housing and a spring holder of a shut-off nozzle according to a comparative example.

FIG. 7 shows a cross section of a valve housing 102 and a spring holder 103 provided in a shut-off nozzle 101 according to a comparative example. In the valve housing 102, communication holes 105, 105, . . . are also formed and, although not shown in FIG. 7, a needle hole is opened and a needle valve is inserted therein. However, a spring holder hole 108 formed in the valve housing 102 according to the comparative example is different from that formed in the valve housing 37 (see FIG. 6B) according to the present illustrative embodiment. That is, in the spring holder hole 108, the cleaning-purpose enlargement portions 56, 56 formed in the valve housing 37 according to the present illustrative embodiment are not formed. Therefore, in the valve housing 102 according to the comparative example, the leaked resin tends to accumulate in a range indicated by a reference numeral 110, making the cleaning difficult.

{Modification}

Figure 8A:
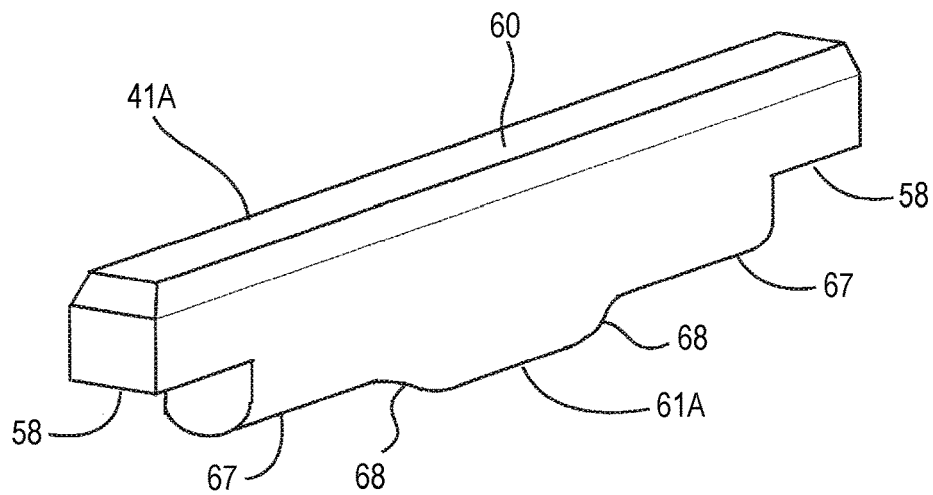
FIG. 8A is a perspective view showing a spring holder of a shut-off nozzle according to a modification of the present illustrative embodiment.
Figure 8B:
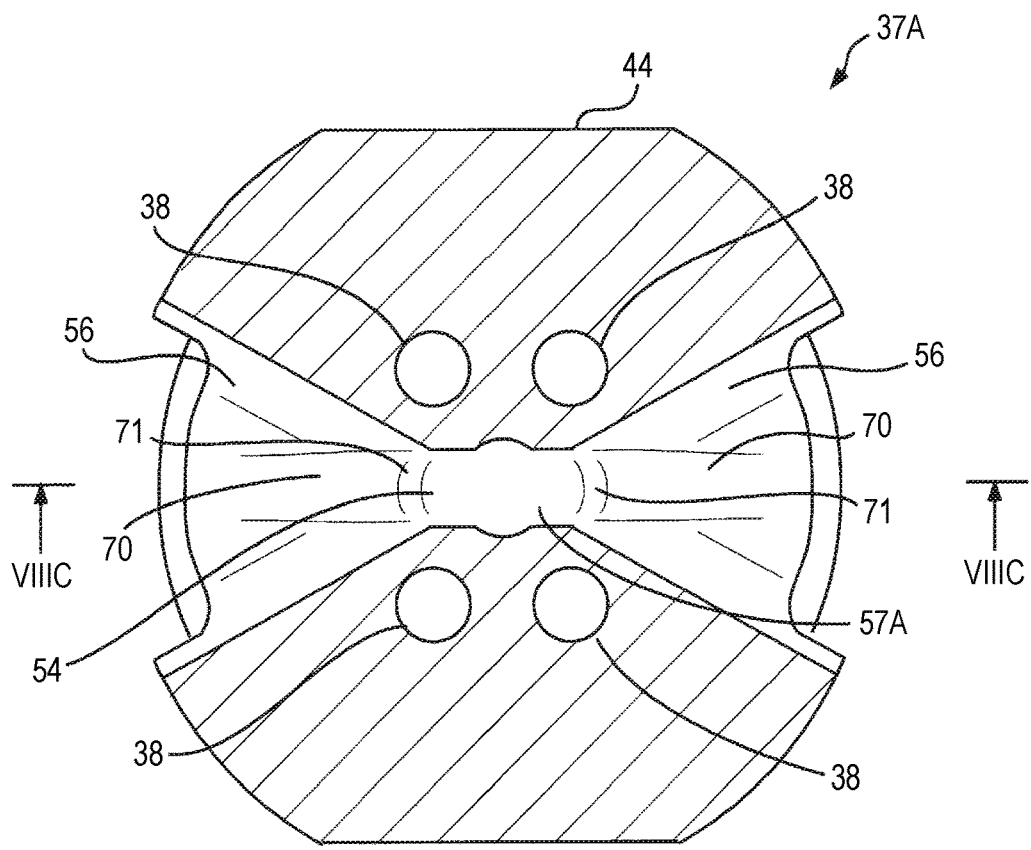
FIG. 8B is a cross-sectional view of a valve housing of the shut-off nozzle according to the modification of the present illustrative embodiment.
Figure 8C:
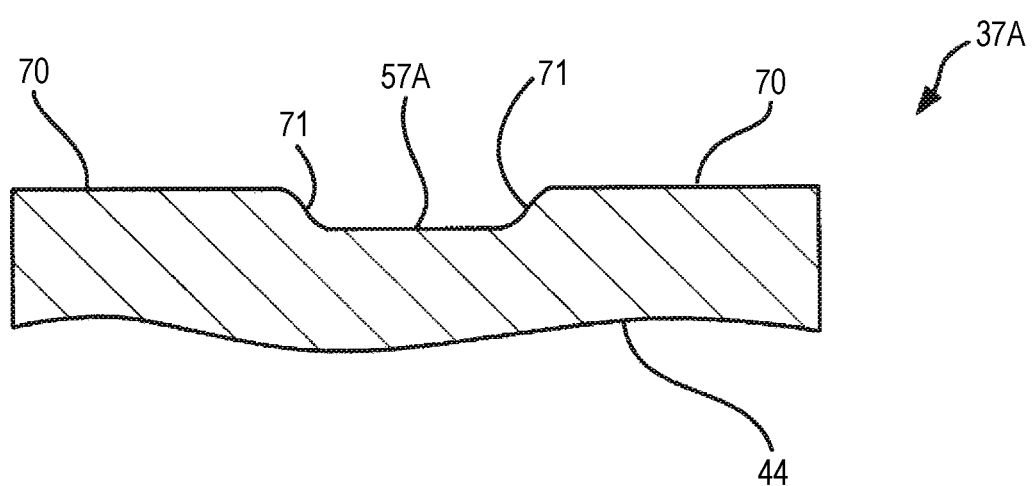
FIG. 8C is a cross-sectional view of the valve housing of the shut-off nozzle according to the modification taken along a line VIIIC-VIIIC in FIG. 8B.

The shut-off nozzle 24 according to the present illustrative embodiment may be modified in various ways. FIG. 8A shows a spring holder 41A according to a modification, and FIGS. 8B and 8C show a valve housing 37A according to the modification. Other components are the same as those shown in FIGS. 1, 2A, and the like, and the description thereof is omitted. In the spring holder 41A according to the modification, a bottom surface side is deformed as shown in FIG. 8A. That is, the convex curved surface 61A has a constant length near the center, and lateral convex curved surfaces 67, 67 having heights different from that at the center are formed on both sides thereof. Since the convex curved surface 61A and the lateral convex curved surfaces 67, 67 have different heights, connection portions 68, 68 therebetween are formed as gently curved inclined surfaces.

In the valve housing 37A according to the modification, as shown in FIG. 8B and FIG. 8C, which is a cross section taken along a line VIIIC-VIIIC in FIG. 8B, a U-shaped groove 57A is formed only in a range of the spring holder hole 54. Recessed grooves 70, 70 both having a depth different from that of the U-shaped groove 57A are formed in portions of the cleaning-purpose enlargement portions 56, 56. Since the U-shaped groove 57A and the recessed grooves 70, 70 have different depths, connection portions 71, 71 therebetween are formed as gently curved inclined surfaces.

In this modification, since the cleaning-purpose enlargement portions 56, 56 are also formed, the leaked resin can be easily cleaned. By the U-shaped groove 57A in the spring holder hole 54 (see FIG. 8B) and the convex curved surface 61A of the spring holder 41A (see FIG. 8A), the resin accumulated in the spring holder hole 54 is pushed out to the cleaning-purpose enlargement portions 56, 56. Further, in the shut-off nozzle 24 according to the modification, the depths of the recessed grooves 70, 70 are shallow, and the connection portions 71, 71 are formed as gently inclined surfaces, so that stress concentration at these portions is reduced. Accordingly, deterioration of the shut-off nozzle 24 can be prevented.

{Other Modifications}

The shut-off nozzle 24 (see FIG. 2A) according to the present illustrative embodiment has been described such that the rear end portion of the needle valve 30 is in contact with the spring holder 41. However, the rear end portion of the needle valve 30 may be fixed to the spring holder 41.

Although the invention made by the present inventors is specifically described based on the illustrative embodiment, it is needless to say that the present invention is not limited to the illustrative embodiment described above, and various modifications can be made without departing from the scope of the invention. The plurality of examples described above may be appropriately combined.

What is claimed is:

1. A shut-off nozzle comprising:
   a nozzle body portion having a resin flow path formed therein;
   a needle valve insertable in the nozzle body portion coaxially with the nozzle body portion and configured to open and close an outlet of the resin flow path; and
   a needle driving mechanism configured to drive the needle valve, the needle driving mechanism comprising:
      a cylinder mechanism provided in the nozzle body portion; and
      a spring holder configured to transmit a driving force from the cylinder mechanism to the needle valve,
   wherein the nozzle body portion comprises a valve housing, the valve housing having:
      a needle hole in an axial direction, a rear end portion of the needle valve being insertable into the needle hole; and
      a spring holder hole orthogonal to the axial direction,
   wherein the spring holder is inserted in the spring holder hole in a direction orthogonal to the axial direction in a state in which slide of the spring holder in the spring holder hole in the axial direction is allowed, both ends of the spring holder are fixed to the cylinder mechanism, and a central portion of the spring holder is in contact with or connected with the rear end portion of the needle valve, enabling the needle valve to move forward in the axial direction via the spring holder so as to close the outlet when the cylinder mechanism is driven, and
   wherein enlargement portions are formed in opposing side surfaces orthogonal from the center of the spring holder hole of the valve housing, each of the enlargement portions being continuous with the spring holder hole and having a shape enlarged from the spring holder hole.

2. The shut-off nozzle according to claim 1, wherein each of the enlargement portions is formed in a fan shape.

3. The shut-off nozzle according to claim 1,
   wherein the central portion of the spring holder is in contact with the rear end portion of the needle valve;
   wherein the spring holder has a convex curved surface, which has a predetermined length, on a side opposite to a surface in contact with the rear end portion of the needle valve, and
   wherein a U-shaped groove having a U shape is formed in the spring holder hole, the convex curved surface being contactable with the U-shaped groove when the spring holder is moved backward.

4. The shut-off nozzle according to claim 3, wherein a curvature of the convex curved surface is larger than a curvature of the U-shaped groove.

5. The shut-off nozzle according to claim 3, wherein each of the enlargement portions has a recessed groove, the spring holder being contactable with each of the recessed grooves when the spring holder is moved backward.

6. The shut-off nozzle according to claim 5, wherein each of the recessed grooves and the U-shaped groove are smoothly connected via an inclined surface.

7. The shut-off nozzle according to claim 3,
   wherein a resin leaked out from a gap between the needle hole and the needle valve is accumulated in the spring holder hole,
   wherein when the spring holder is moved backward, the leaked resin accumulated in the spring holder hole is pressed by the U-shaped groove and the convex curved surface and is pushed out from the spring holder hole, and
   wherein the enlargement portions are cleaning-purpose enlargement portions configured to receive the leaked resin moved from the spring holder hole.

8. An injection device comprising:
   a heating cylinder;
   a screw inserted in the heating cylinder; and
   a shut-off nozzle provided in the heating cylinder, the shut-off nozzle comprising:
      a nozzle body portion having a resin flow path formed therein;
      a needle valve insertable in the nozzle body portion coaxially with the nozzle body portion and configured to open and close an outlet of the resin flow path; and
      a needle driving mechanism configured to drive the needle valve, the needle driving mechanism comprising:
         a cylinder mechanism provided in the nozzle body portion; and
         a spring holder configured to transmit a driving force from the cylinder mechanism to the needle valve,
      wherein the nozzle body portion comprises a valve housing, the valve housing having:
         a needle hole in an axial direction, a rear end portion of the needle valve being insertable into the needle hole; and
         a spring holder hole orthogonal to the axial direction,
      wherein the spring holder is inserted in the spring holder hole in a direction orthogonal to the axial direction in a state in which slide of the spring holder in the spring holder hole in the axial direction is allowed, both ends of the spring holder are fixed to the cylinder mechanism, and a central portion of the spring holder is in contact with or connected with the rear end portion of the needle valve, enabling the needle valve to move forward in the axial direction via the spring holder so as to close the outlet when the cylinder mechanism is driven, and
      wherein enlargement portions are formed in opposing side surfaces orthogonal from the center of the spring holder hole of the valve housing, each of the enlargement portions being continuous with the spring holder hole and having a shape enlarged from the spring holder hole.

9. The injection device according to claim 8, wherein each of the enlargement portions is formed in a fan shape.

10. The injection device according to claim 8,
    wherein the central portion of the spring holder is in contact with the rear end portion of the needle valve;
    wherein the spring holder has a convex curved surface, which has a predetermined length, on a side opposite to a surface in contact with the rear end portion of the needle valve, and
    wherein a U-shaped groove having a U shape is formed in the spring holder hole, the convex curved surface being contactable with the U-shaped groove when the spring holder is moved backward.

11. The injection device according to claim 10, wherein a curvature of the convex curved surface is larger than a curvature of the U-shaped groove.

12. The injection device according to claim 10, wherein each of the enlargement portions has a recessed groove, the spring holder being contactable with each of the recessed grooves when the spring holder is moved backward.

13. The injection device according to claim 12, wherein each of the recessed grooves and the U-shaped groove are smoothly connected via an inclined surface.

14. The injection device according to claim 10,
wherein a resin leaked out from a gap between the needle hole and the needle valve is accumulated in the spring holder hole,
wherein when the spring holder is moved backward, the leaked resin accumulated in the spring holder hole is pressed by the U-shaped groove and the convex curved surface and is pushed out from the spring holder hole, and
wherein the enlargement portions are cleaning-purpose enlargement portions configured to receive the leaked resin moved from the spring holder hole.

15. An injection molding machine comprising:
a mold clamping device configured to clamp a mold,
an injection device configured to inject a resin, the injection device comprising:
a heating cylinder;
a screw inserted in the heating cylinder; and
a shut-off nozzle provided in the heating cylinder,
wherein the shut-off nozzle comprises:
a nozzle body portion having a resin flow path formed therein;
a needle valve insertable in the nozzle body portion coaxially with the nozzle body portion and configured to open and close an outlet of the resin flow path; and
a needle driving mechanism configured to drive the needle valve, the needle driving mechanism comprising:
a cylinder mechanism provided in the nozzle body portion; and
a spring holder configured to transmit a driving force from the cylinder mechanism to the needle valve,
wherein the nozzle body portion comprises a valve housing, the valve housing having:
a needle hole in an axial direction, a rear end portion of the needle valve being insertable into the needle hole; and
a spring holder hole orthogonal to the axial direction,
wherein the spring holder is inserted in the spring holder hole in a direction orthogonal to the axial direction in a state in which slide of the spring holder in the spring holder hole in the axial direction is allowed, both ends of the spring holder are fixed to the cylinder mechanism, and a central portion of the spring holder is in contact with or connected with the rear end portion of the needle valve, enabling the needle valve to move forward in the axial direction via the spring holder so as to close the outlet when the cylinder mechanism is driven, and
wherein enlargement portions are formed in opposing side surfaces orthogonal from the center of the spring holder hole of the valve housing, each of the enlargement portions being continuous with the spring holder hole and having a shape enlarged from the spring holder hole.

\* \* \* \* \*